United States Patent
Huang et al.

(10) Patent No.: US 11,630,787 B2
(45) Date of Patent: Apr. 18, 2023

(54) BUS SYSTEM

(71) Applicant: Nuvoton Technology Corporation, Hsinchu (TW)

(72) Inventors: Chih-Hung Huang, New Taipei (TW); Kang-Fu Chiu, Hsinchu (TW); Hao-Yang Chang, Miaoli County (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 0 days.

(21) Appl. No.: 17/551,399

(22) Filed: Dec. 15, 2021

(65) Prior Publication Data

US 2022/0365890 A1    Nov. 17, 2022

(30) Foreign Application Priority Data

May 17, 2021 (TW) .................................. 110117650

(51) Int. Cl.
*G06F 13/16* (2006.01)
*G06F 13/42* (2006.01)

(52) U.S. Cl.
CPC ...... *G06F 13/1668* (2013.01); *G06F 13/4282* (2013.01)

(58) Field of Classification Search
CPC .................................................. G06F 13/4291
See application file for complete search history.

(56) References Cited

U.S. PATENT DOCUMENTS

| 4,831,358 A * | 5/1989 | Ferrio ................. G06F 13/4213 370/445 |
| 2018/0143935 A1 | 5/2018 | Cox et al. |
| 2020/0089628 A1 | 3/2020 | Wang et al. |
| 2021/0081341 A1 | 3/2021 | Chiu et al. |

FOREIGN PATENT DOCUMENTS

| TW | 200907688 A | 2/2009 |
| TW | 202022628 A | 6/2020 |
| TW | 202102999 A | 1/2021 |
| TW | I-719633 B | 2/2021 |

OTHER PUBLICATIONS

Office Action dated Jan. 18, 2022 in TW Application No. 110117650, 8 pages.

* cited by examiner

*Primary Examiner* — Henry Tsai
*Assistant Examiner* — Juanito C Borromeo
(74) *Attorney, Agent, or Firm* — Muncy, Geissler, Olds & Lowe, P.C.

(57) ABSTRACT

A bus system is provided. A memory device is electrically connected to a master device via a serial peripheral interface (SPI) bus. A plurality of slave devices are electrically connected to the master device via an enhanced SPI (eSPI) bus. Each of the slave devices has an alert handshake pin. The alert handshake pins of the slave devices are electrically connected together via an alert-handshake control line. The first slave device is electrically connected to the memory device via the SPI bus. After obtaining a program code from the memory device, the first slave device verifies the program code using a security code and controls the alert-handshake control line to unlock all the slave devices except for the first slave device via the alert handshake pin in response to the program code being verified. The unlocked (Continued)

slave devices communicate with the master device via the eSPI bus.

10 Claims, 8 Drawing Sheets

BUS SYSTEM

CROSS REFERENCE TO RELATED APPLICATIONS

This application claims priority of Taiwan Patent Application No. 110117650, filed on May 17, 2021, the entirety of which is incorporated by reference herein.

BACKGROUND OF THE INVENTION

Field of the Invention

The invention relates to a bus system, and more particularly to a bus system including a plurality of slave devices.

Description of the Related Art

In a conventional computer system, a chip set such as a south bridge chip is electrically connected to another external circuit module (such as a system-on-a-chip (SoC) with various functions) through a low pin count (LPC) interface. The external circuit modules coupled through the LPC interface are respectively assigned to different independent addresses. As a result, the south bridge chip can communicate with the external circuit modules using one-to-many communication. However, in recent years, new bus architectures, such as an enhanced serial peripheral interface (eSPI) bus, began only allowing a one-to-one communication mechanism to be employed between a chip set and the external circuit modules.

Therefore, a scheme capable of scheduling a plurality of circuit modules of a bus is desirable.

BRIEF SUMMARY OF THE INVENTION

Bus systems are provided. An embodiment of a bus system is provided. The bus system includes a master device, an enhanced serial peripheral interface (eSPI) bus, a serial peripheral interface (SPI) bus, a memory device electrically connected to the master device via the SPI bus, and a plurality of slave devices electrically connected to the master device via the eSPI bus. Each of the slave devices has an alert handshake pin, and the alert handshake pins of the slave devices are electrically connected together via an alert-handshake control line. The first slave device is electrically connected to the memory device via the SPI bus. After obtaining the program code from the memory device, the first slave device is configured to verify the program code using a security code, and to control the alert-handshake control line to unlock all the slave devices except for the first slave device via the alert handshake pin in response to the program code being verified. The unlocked slave devices are configured to communicate with the master device via the eSPI bus.

Moreover, an embodiment of a bus system is provided. The bus system includes a master device, an enhanced serial peripheral interface (eSPI) bus, a serial peripheral interface (SPI) bus, a memory device electrically connected to the master device via the SPI bus, and a plurality of slave devices electrically connected to the master device via the eSPI bus. Each of the slave devices has an alert handshake pin, and the alert handshake pins of the slave devices are electrically connected together via an alert-handshake control line. The first of the slave devices is electrically connected to the memory device via the SPI bus. After obtaining a plurality of program codes from the memory device, the first slave device is configured to verify the program codes using a security code. In response to the program codes being verified, the first slave device is configured to control the alert-handshake control line via the alert handshake pin to unlock the slave devices corresponding to the verified program codes. After unlocking, the slave devices corresponding to the verified program codes are configured to communicate with the master device through the eSPI bus.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
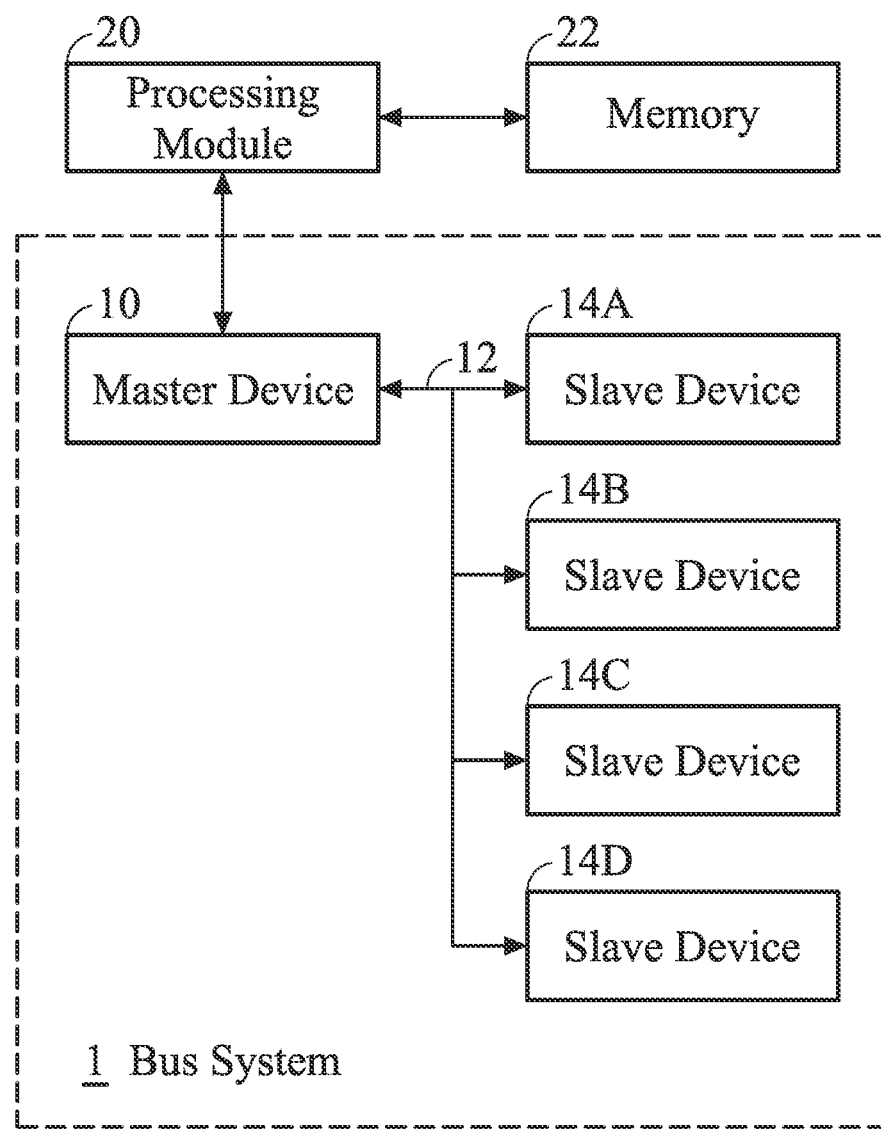
FIG. 1 shows a bus system according to some embodiments of the invention.

FIG. 1 shows a bus system 1 according to some embodiments of the invention. The bus system 1 includes a master device 10, a bus 12, and a plurality of slave devices 14A through 14D. In some embodiments, the master device 10 may be a south bridge chip. In some embodiments, the master device 10 is electrically connected to a processing module 20 of a computer system (not shown), so as to access data with the slave devices 14A through 14D via the bus 12 in response to instruction of the processing module 20. In some embodiments, the processing module 20 is electrically connected to a memory 22 of a computer system, so as to access the memory 22 according to the requirements of different application programs. In some embodiments, the bus 12 may be an enhanced serial peripheral interface (eSPI) bus. The master device 10 is electrically connected to the slave devices 14A through 14D via the bus 12. Furthermore, the master device 10 is configured to perform eSPI communication with the slave devices 14A through 14D by using a one-to-one communication mechanism, and the slave devices 14A through 14D are configured to communicate with the master device 10 by using an arbitration mechanism. It should be noted that the number of slave devices 14A through 14D as illustrated is used as an example, and not to limit the invention.

Figure 2:
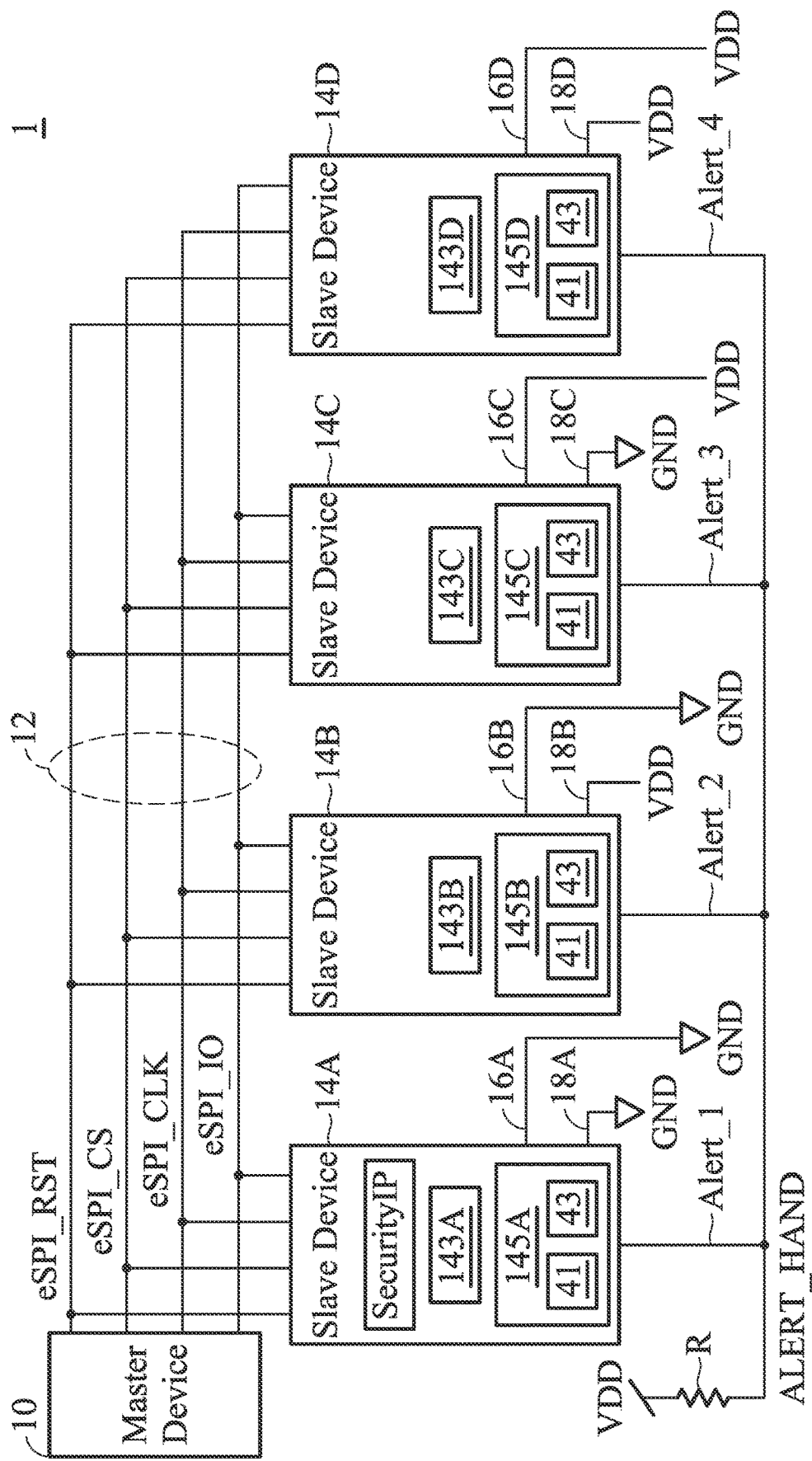
FIG. 2 shows the connection configuration of the bus system in FIG. 1 according to some embodiments of the invention.

FIG. 2 shows the connection configuration of the bus system 1 in FIG. 1 according to some embodiments of the invention. In such embodiment, the bus 12 includes a reset signal line eSPI_RST, a chip select signal line eSPI_CS, a clock signal eSPI_CLK and an input/output signal line eSPI_IO. The master device 10 is configured to perform the eSPI communication with the slave devices 14A through 14D via the chip select signal line eSPI_CS based on one-to-one communication mechanism. Furthermore, based on the arbitration mechanism, the slave devices 14A through 14D are configured to perform the eSPI communication (e.g., data and instruction (or command) transmission) with the master device 10 via the input/output signal line eSPI_IO. When the master device 10 is configured to perform the eSPI communication with the slave devices 14A through 14D via the bus 12, the clock signal eSPI_CLK is used as a reference clock.

In general, according to the operation mechanism of the chip select signal line eSPI_CS, the master device 10 can only select a single slave device for the eSPI communication. However, in the bus system 1, only one of the slave devices 14A through 14D is able to respond to the master device 10 at a time slot based on the arbitration mechanism. Therefore, when the master device 10 still operates with a one-to-one communication mechanism, the bus 12 can connect the slave devices 14A through 14D to perform the eSPI communication in response to the chip select signal line eSPI_CS, thereby increasing the expandability of the bus system 1.

In FIG. 2, the slave devices 14A through 14D include the address section selection pin 18A through 18D, the address entry selection pin 16A through 16D and the alert handshake pins Alert_1 through Alert_4. The addresses corresponding to the slave devices 14A through 14D can be assigned according to a combination of the voltage levels received by the address section selection pins 18A through 18D and the address entry selection pins 16A through 16D, so that the slave devices 14A through 14D can have different address sections. For example, the address section selection pins 18A and 18C of the slave devices 14A and 14C are coupled to a ground GND, so as to correspond to a first address section. The address entry selection pins 16A and 16C of the slave devices 14A and 14C are coupled to the ground GND and a power supply VDD, so as to respectively correspond to the different address entry codes. For example, they may respectively correspond to a first address and a second address of the first address section. Furthermore, the address section selection pins 18B and 18D of the slave devices 14B and 14D are coupled to the power supply VDD, so as to correspond to a second address section. The address entry selection pins 16B and 16D of the slave devices 14B and 14D are coupled to the ground GND and the power supply VDD, so as to respectively correspond to the different address entry codes. For example, they may respectively correspond to a first address and a second address of the second address section. It should be noted that the configuration of the address entry selection pins 16A through 16D and the address section selection pins 18A through 18D is used as an example and not to limit the invention. In other embodiments, any suitable configuration can be used to set the address sections corresponding to the slave devices 14A through 14D.

The alert handshake pins Alert_1 through Alert_4 of the slave devices 14A through 14D are electrically connected to the alert-handshake control line ALERT_HAND. In such embodiment, the alert-handshake control line ALERT_HAND is electrically connected to the power supply VDD through a pull-up resistor R, so that the alert-handshake control line ALERT_HAND is at a high-voltage level (e.g., a high logic signal "H"). Moreover, the scheduling controllers 145A through 145D of the slave devices 14A through 14D can pull the corresponding alert handshake pins Alert_1 through Alert_4 to a low-voltage level (e.g., a low logic signal "L") for driving the alert-handshake control line ALERT_HAND, so that the alert-handshake control line ALERT_HAND is at a low-voltage level. Thus, each of the slave devices 14A through 14D can obtain the right to actively communicate with the master device 10 by controlling the voltage level of the alert-handshake control line ALERT_HAND. The alert handshake pins Alert_1 through Alert_4 are the bi-directional input/output pins, and the alert handshake pins Alert_1 through Alert_4 are operating as an open drain in the output mode. In some embodiments, the alert-handshake control line ALERT_HAND is electrically connected to the ground GND through a pull-down resistor, so that the alert-handshake control line ALERT_HAND is at a low-voltage level (e.g., a low logic signal "L").

In FIG. 2, each of the slave devices 14A through 14D includes the respective requirement controller 143A through 143D. Taking the slave device 14A as an example, the requirement controller 143A of the slave device 14A is configured to perform the eSPI communicate with the master device 10 via the bus 12. For example, when the slave device 14A communicates with the master device 10, the requirement controller 143A is configured to control the slave device 14A to receive commands and data from the master device 10 via the bus 12, and to provide the corresponding data to the master device 10. Furthermore, the requirement controller 143A is further configured to control the slave device 14A to perform the single-wire data Access (SWDA) communication with other slave devices (e.g., the slave device 14B, 14C and/or 14D) and/or the peripheral devices (not shown) via the alert-handshake control line ALERT_HAND. For example, when the slave device 14A communicates with the slave device 14B, 14C, and/or 14D, the requirement controller 143A is configured to control the slave device 14A to transmit the commands and data to a single slave device (i.e., one-to-one communication) or multiple slave devices (i.e., one-to-many broadcast) via the alert-handshake control line ALERT_HAND. Furthermore, the requirement controller 143A is also configured to control the slave device 14A to receive the commands and data from the slave device 14B, 14C, or 14D via the alert-handshake control line ALERT_HAND. Moreover, each of the slave devices 14A through 14D further includes the respective scheduling controllers 145A through 145D. Each of the scheduling controllers 145A through 145D is configured to control the alert-handshake control line ALERT_HAND for communication sequence of the eSPI communication and/or the SWDA communication. In addition, the priority of the alert-handshake control line ALERT_HAND controlled by the slave device 14A through 14D is determined by the address section selection pins 18A through 18D and the address entry selection pins 16A through 16D in FIG. 2. In other embodiments, other hardware or software settings can be used to determine the priority of the alert-handshake control line ALERT_HAND controlled by the slave device 14A through 14D.

In the bus system 1, the slave device 14A is the main device for safety verification. It should be noted that after the bus system 1 is enabled, the slave devices 14B through 14D are in a locked state, that is, the master device 10 cannot communicate with the slave devices 14B through 14D. After obtaining the firmware from the memory device, the slave device 14A authenticates the obtained firmware according to the pre-stored security code SecurityIP (or identification code), so as to confirm whether the firmware is usable and correct. After the firmware authentication is successful, the slave device 14A is configured to perform the SWDA communicate with other slave devices (i.e., the slave devices 14B, 14C and/or 14D) and/or peripheral devices (not shown) via the alert-handshake control line ALERT_HAND, so as to unlock the other slave devices and/or peripheral devices. Thus, the unlocked slave device can perform the eSPI communicate with the master device 10. On the other hand, when the firmware authentication fails, the slave device 14A cannot unlock other slave devices. Therefore, the data of the locked slave devices can be prevented from being read abnormally. In some embodiments, the slave device 14A uses the security code SecurityIP and specific encryption and decryption operations (such as public key acceleration (PKA), advanced encryption standard (AES), secure hash algorithm (SHA)) and so on) to verify the obtained firmware.

In the slave devices 14A through 14D, each of the scheduling controllers 145A through 145D further includes a packet encoder 41 and a packet decoder 43. In each of the scheduling controllers 145A through 145D, the packet encoder 41 is configured to encode the packets of SWDA communication that is to be provided to other slave devices through the alert-handshake control line ALERT_HAND according to a specific key. In addition, the packet decoder 43 is configured to decode the packets of SWDA communication from other slave devices received via the alert-handshake control line ALERT_HAND according to the specific key. Furthermore, the specific key is built in the slave devices 14A through 14D. In some embodiments, each slave device has the same specific key. In addition, according to different applications and different manufacturers of the bus system 1, each slave device may have a different and associated key.

Figure 3:
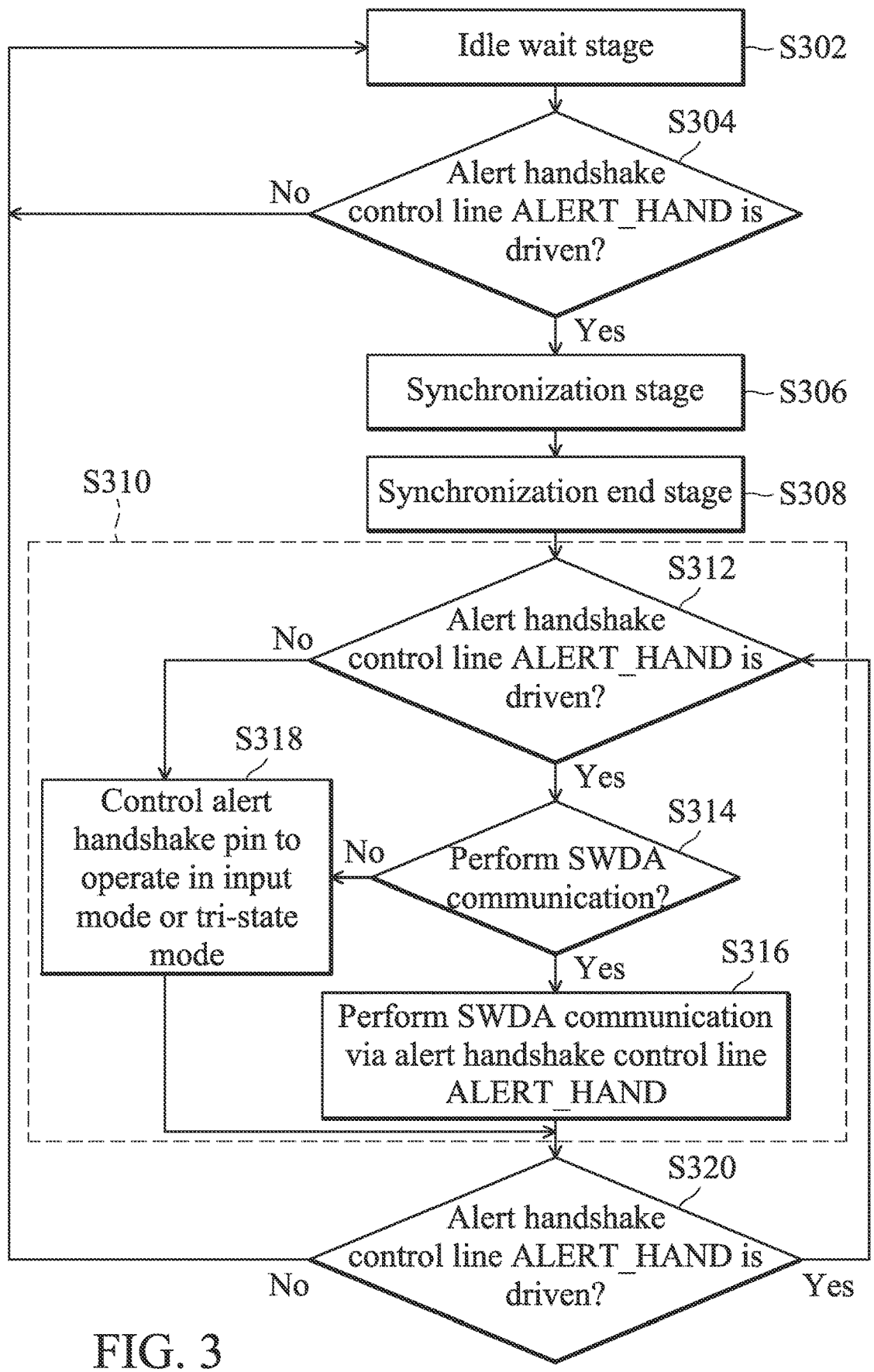
FIG. 3 shows a flowchart illustrating a scheduling control method of the SWDA communication of the bus system according to some embodiments of the invention.

FIG. 3 shows a flowchart illustrating a scheduling control method of the SWDA communication of the bus system 1 according to some embodiments of the invention. The scheduling control method shown in FIG. 3 can be executed by each of the scheduling controllers 145A through 145D of the slave devices 14A through 14D in the bus system 1.

In the bus system 1, the slave devices 14A through 14D are configured to use the clock signals having the same frequency as the counting basis for the scheduling controllers 145A through 145D. In some embodiments, the clock signals of the slave devices 14A through 14D have the same phase. In some embodiments, the clock signals of the slave devices 14A through 14D have different phases. In some embodiments, the clock signals of the slave devices 14A through 14D have the same frequencies. In some embodiments, the scheduling controllers 145A through 145D are configured to perform the counting operations according to the rising edges of the clock signals. In some embodiments, the scheduling controllers 145A through 145D are configured to perform the counting operations according to the falling edges of the clock signals.

When detecting that the alert-handshake control line ALERT_HAND is not driven, the scheduling controllers 145A through 145D are configured to control the slave devices 14A through 14D to enter the idle wait stage ST_IdleWait (step S302). In the idle wait stage ST_IdleWait, each of the scheduling controllers 145A through 145D of the slave devices 14A through 14D is configured to control the corresponding alert handshake pins Alert_1 through Alert_4 to operate in the input mode, so as to monitor whether the alert-handshake control line ALERT_HAND is driven by any one of the slave devices 14A through 14D (step S304), for example, the alert-handshake control line ALERT_HAND is changed from the high voltage level to the low voltage level.

In step S304, when detecting that the alert-handshake control line ALERT_HAND is not driven by any one of slave devices 14A through 14D, each of the scheduling controllers 145A through 145D is configured to control the slave devices 14A through 14D to keep operating in the idle wait stage ST_IdleWait (step S302), until detecting that the alert-handshake control line ALERT_HAND is driven (step S304). When detecting that the alert-handshake control line ALERT_HAND is driven (e.g., the alert-handshake control line ALERT_HAND is at the low voltage level), each of the scheduling controllers 145A through 145D is configured to control the slave devices 14A through 14D to enter the synchronization stage ST_Sync (step S306). Thus, the slave devices 14A through 14D of the bus system 1 are configured to enter the synchronization stage ST_Sync at the same time.

After the bus system 1 enters the synchronization stage ST_Sync (step S306), the slave device requesting an interrupt is configured to control the alert handshake pin thereof to operate in the output mode and then to output the low voltage level, so as to drive the alert-handshake control line ALERT_HAND by clock cycles more than a specific number (e.g., more than three clock cycles), thereby facilitating other slave devices in the bus system 1 to distinguish that the bus system 1 enters the synchronization stage ST_Sync rather than other stage (e.g., the assignment stage ST_Ass). After the alert-handshake control line ALERT_HAND is driven by more than three clock cycles, the slave device requesting the interrupt is configured to stop driving the alert-handshake control line ALERT_HAND, and then to control the alert handshake pin thereof to operate in the input mode, so as to monitor the alert-handshake control line ALERT_HAND. At the same time, other slave devices of the bus system 1 may detect that the alert-handshake control line ALERT_HAND is recovered as the high voltage level, so that all slave devices can simultaneously enter the synchronization end stage ST_SyncEnd (step S308).

In the synchronization end stage ST_SyncEnd, each of the scheduling controllers 145A through 145D is configured to wait at least one clock cycle, to ensure that all slave devices 14A through 14D of the bus system 1 complete the synchronization stage ST_Sync, and then the scheduling controllers 145A through 145D are configured to control the slave devices 14A through 14D to enter the assignment stage ST_Ass from the synchronization end stage ST_SyncEnd (step S310).

After entering the assignment stage ST_Ass, each of the scheduling controllers 145A through 145D of the slave devices 14A through 14D is configured to determine whether there is an interrupt requirement for the SWDA communication and/or the eSPI communication, so as to control the corresponding alert handshake pins Alert_1 through Alert_4 to drive the alert-handshake control line ALERT_HAND (step S312). If there is no need to drive the alert-handshake control line ALERT_HAND (i.e., no interrupt requirement), the alert handshake pins Alert_1 through Alert_4 are controlled to operate in the input mode or the tri-state mode (step S318 of FIG. 3). If one of the slave devices 14A through 14D drives the alert-handshake control line ALERT_HAND via the corresponding alert handshake pin, it is determined whether the slave device needs to perform the SWDA communication (step S314). If the slave device only performs the eSPI communication, the slave device is configured to control the corresponding alert handshake pin to operate in the input mode or the tri-state mode (step S318 in FIG. 3). If the slave device wants to perform the SWDA communication with other slave devices, the scheduling controller of the slave device is configured to control the corresponding alert handshake pin, so as to control the alert-handshake control line ALERT_HAND for the SWDA communication (step S316). Next, when it is detected that the alert-handshake control line ALERT_HAND is not driven (step S320), the scheduling controllers 145A through 145D are configured to control the slave devices 14A through 14D to enter the idle wait stage ST_IdleWait again (step S302). If it is detected that the alert-handshake control line ALERT_HAND is driven (step S320), the flow returns to step S312.

In the embodiments of the invention, the signals and/or packets transmitted in the SWDA communication via the alert-handshake control line ALERT_HAND are just an example. In other embodiments, the slave devices 14A through 14D are configured to transmit signals and packets of any types of protocols via the alert-handshake control line ALERT_HAND, such as the serial communication protocols (e.g., I2C, UART, and SPI). Moreover, similar to other serial communication protocols, each device in SWDA communication has an individual identification code. In addition, the packet of SWDA communication may include information such as target identification code, commands, and data.

In the assignment stage ST_Ass, the slave devices 14A through 14D are configured to monitor state of the alert-handshake control line ALERT_HAND via the alert handshake pins Alert_1 through Alert_4 in each assignment period. Furthermore, the slave devices 14A through 14D have the assignment periods with the same time periods. Moreover, in the assignment stage ST_Ass, each of slave devices 14A through 14D is configured to perform the corresponding operation according to the respective phase.

In the assignment stage ST_Ass, when the alert-handshake control line ALERT_HAND is not driven, if each of the slave device 14A through 14D wants to perform the eSPI communication with the master device 10 or the SWDA communication with other slave devices 14A through 14D, the slave device has right to drive the alert-handshake control line ALERT_HAND in the corresponding phase of its assignment period. For example, if the slave device 14A wants to perform the eSPI communication with the master device 10 or the SWDA communication with the slave devices 14B through 14D, the slave device 14A has right to drive the alert-handshake control line ALERT_HAND in the corresponding phase of the assignment period. Specifically, when the slave device 14A performs the eSPI communication and/or the SWDA communication, the scheduling controller 145A of the slave device 14A is configured to control the alert handshake pin Alert_1 to operate in the output mode and output the low voltage level, so as to drive the alert-handshake control line ALERT_HAND (step S312 of FIG. 3), that is the alert-handshake control line ALERT_HAND is controlled at the low voltage level. If the slave device 14A does not need to perform the eSPI communication or the SWDA communication, the scheduling controller 145A of the slave device 14A is configured to control the alert handshake pin Alert_1 to operate in the input mode or the tri-state mode (step S318 of FIG. 3), i.e., not driving the alert-handshake control line ALERT_HAND. Next, in other phases of the assignment period, the slave device 14A is configured to monitor the voltage level of the alert-handshake control line ALERT_HAND, to determine whether the slave devices 14B through 14D have interrupt requirements for the eSPI communication and/or the SWDA communication. In the other words, when the alert-handshake control line ALERT_HAND is not driven, the scheduling controller 145A of the slave device 14A is configured to control the alert-handshake control line ALERT_1 to operate in the input mode in other phases.

It should be noted that each of the slave devices 14A through 14D is configured to perform the SWDA communication through the alert-handshake control line ALERT_HAND in the phases corresponding to the other slave devices in the assignment period, thereby increasing efficiency and flexibility in scheduling for the bus system 1.

Figure 4:
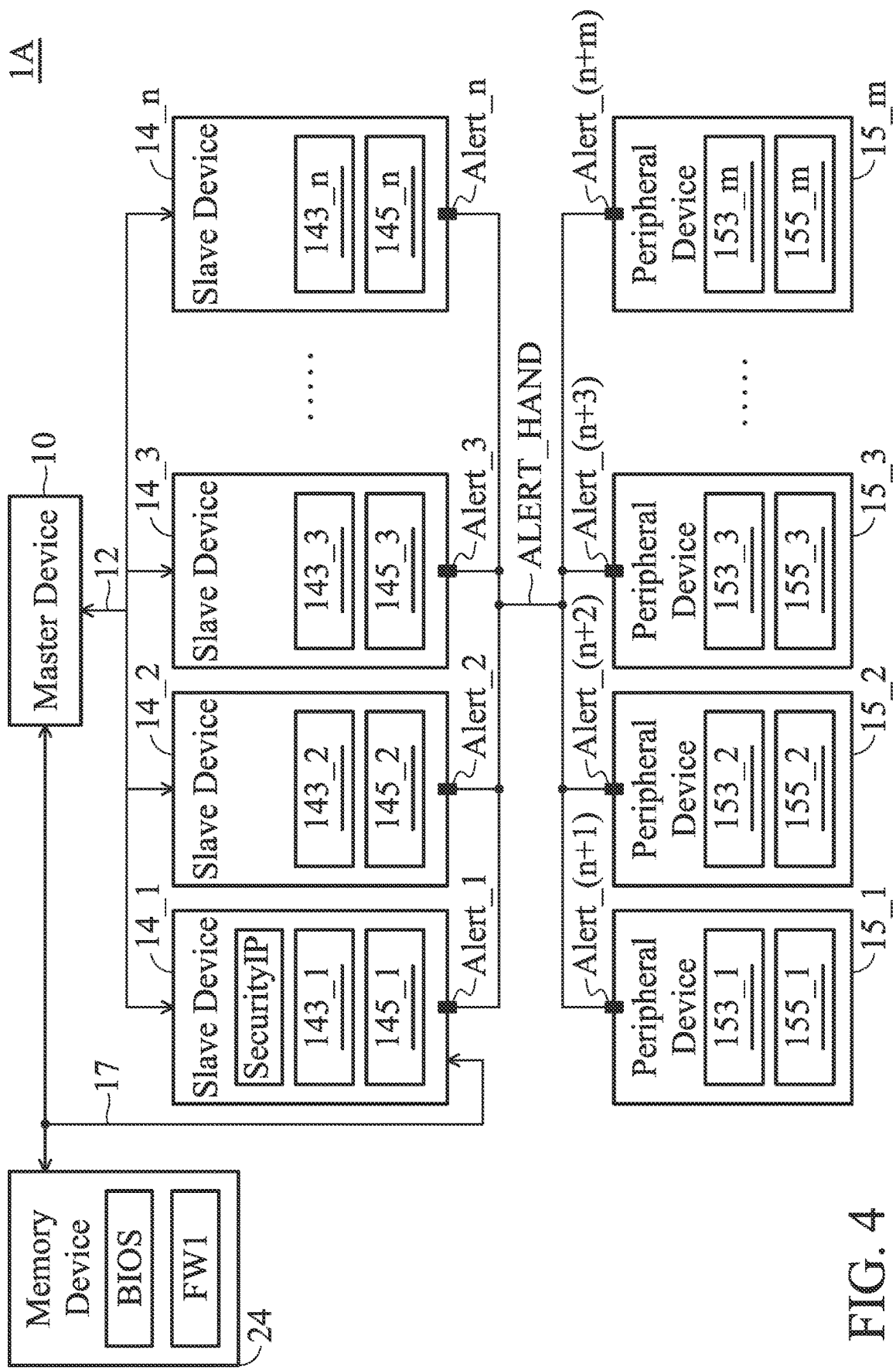
FIG. 4 shows the connection configuration of a bus system according to some embodiments of the invention.

FIG. 4 shows the connection configuration of a bus system 1A according to some embodiments of the invention. The master device 10 is electrically connected to the slave device 14_1 through 14_n via the bus 12. As described above, the bus 12 is an eSPI bus. In addition, the master device 10 is electrically connected to the memory device 24 via the bus 17. In FIG. 4, the bus 17 is an SPI bus, and the memory device 24 is a flash memory. Moreover, the memory device 24 is used to store the program codes, such as the basic input/output system (BIOS) of the master device 10 and the firmware FW1 of the slave device 14_1. In some embodiments, the BIOS of the master device 10 and the firmware FW1 of the slave device 14_1 are stored in different memory devices.

In FIG. 4, the alert handshaking pins Alert_1 through Alert_n of the slave devices 14_1 through 14_n are electrically connected together via the alert-handshake control line ALERT_HAND. As described above, each of the slave devices 14_1 through 14_n includes the respective requirement controllers 143_1 through 143_n and the respective scheduling controllers 145_1 through 145_n, and each of schedule controllers 1451 through 145_n includes a packet encoder (not shown) and a packet decoder (not shown). Furthermore, the slave devices 14_1 through 14_n are further electrically connected to the alert handshaking pins Alert_(n+1) through Alert_(n+m) of the peripheral devices 15_1 through 15_m via the alert-handshake control line ALERT_HAND. In some embodiments, the peripheral devices 15_1 through 15_m are fans for dissipating heat from the bus system 1A. In some embodiments, each of peripheral devices 151 through 15_m includes the respective requirement controller 153_1 through 153_m and the respective scheduling controller 155_1 through 155_m. Similar to the slave devices 14_1 through 14_n, each of scheduling controllers 155_1 through 155_m of the peripheral devices 15_1 through 15_m further includes a packet encoder (not shown) and a packet decoder (not shown).

In the bus system 1A, the slave device 14_1 is the main device for security verification. Therefore, compared to the slave devices 14_2 through 14_n, the slave device 14_1 further includes the security code SecurityIP. In addition, in the initial stage of the bus system 1A booting up, the slave devices 14_2 through 14_n are in a locked state, i.e., the master device 10 cannot communicate with the slave devices 142 through 14_n. Moreover, during the initial stage of booting the bus system 1A, the master device 10 is configured to load the BIOS from the memory device 24 via the bus 17, and to perform the boot process according to the BIOS. In some embodiments, after the master device 10 completes the boot process, the master device 10 is configured to load the firmware FW1 from the memory device 24 via the bus 17, and to perform the eSPI communication via the bus 12, so as to provide the firmware FW1 to the slave device 14_1. In some embodiments, the slave device 14_1 is configured to load the firmware FW1 from the memory device 24 via the bus 17. In some embodiments, only the slave device 14_1 is electrically connected to the memory device 24 via the bus 17. In other words, the slave devices 14_2 through 14_n are electrically separated from the memory device 24.

After obtaining the firmware FW1, the slave device 14_1 is configured to authenticate the firmware FW1 according to the built-in security code SecurityIP, to confirm whether the firmware FW1 is usable and correct. After the authentication is successful, the slave device 14_1 is configured to perform the SWDA communication with the slave devices 14_2 through 14_n and the peripheral devices 15_1 through 15_m via the alert-handshake control line ALERT_HAND, so as to unlock the slave devices 14_2 through 14_n and peripheral devices 15_1 through 15_m. Thus, the unlocked slave devices 14_2 through 14_n can perform the eSPI communicate with the master device 10. In addition, the slave device 14_1 and the unlocked slave devices 14_2 through 14_n can also perform the SWDA communication with the peripheral devices 15_1 through 15_m via the alert-handshake control line ALERT_HAND, so as to control the operations of the unlocked peripheral devices 15_1 through 15_m. As described above, during the SWDA communication, each of slave devices 14_1 through 14_n is configured to use a specific key to decode the received packet and/or encode the packet to be transmitted.

Figure 5:
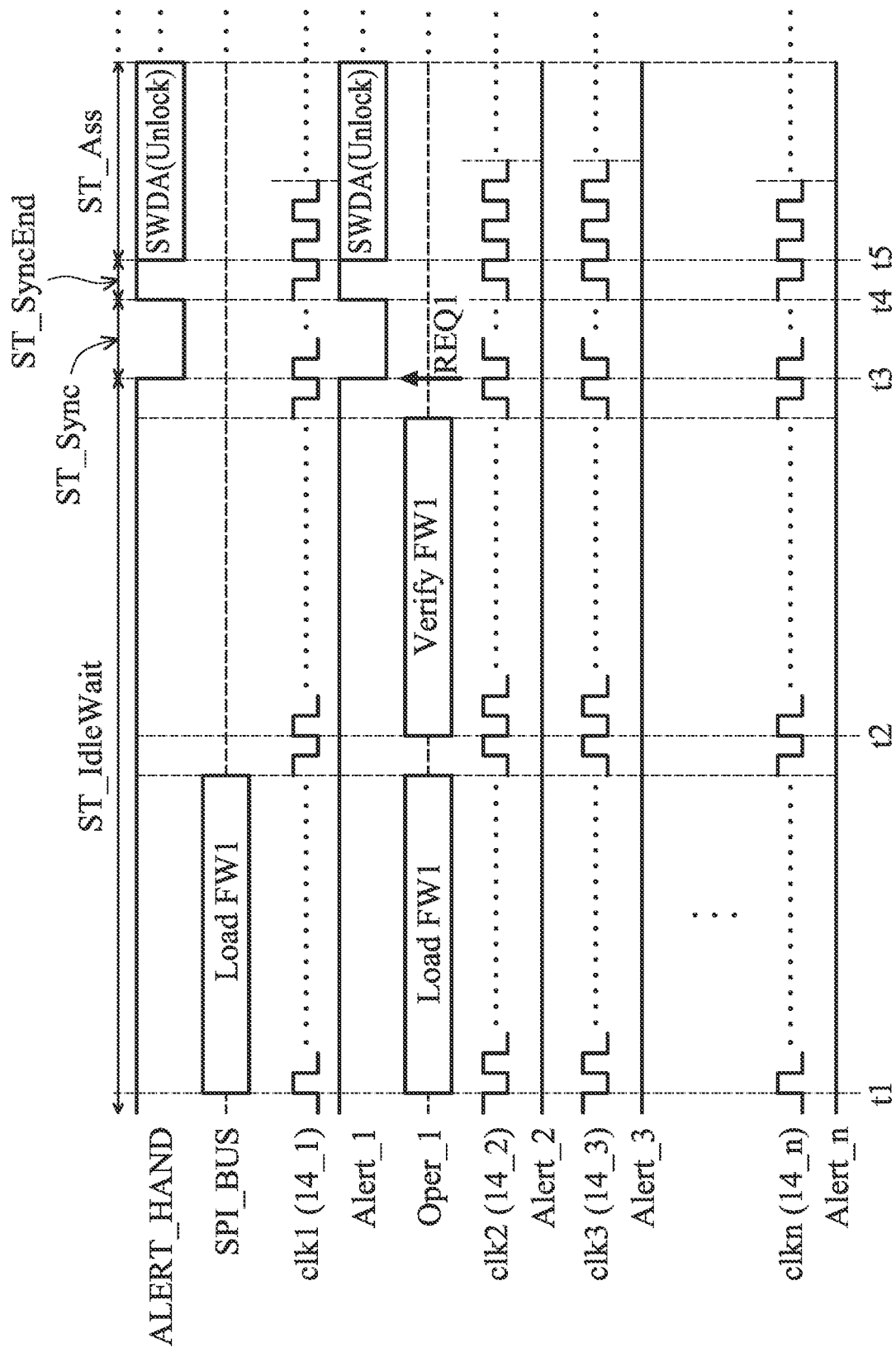
FIG. 5 shows an exemplary waveform diagram of the bus system in FIG. 4 illustrating the slave devices drives the alert-handshake control line ALERT_HAND according to the scheduling control method of SWDA communication in FIG. 3.

FIG. 5 shows an exemplary waveform diagram of the bus system 1A in FIG. 4 illustrating the slave devices 14_1 through 14_n drives the alert-handshake control line ALERT_HAND according to the scheduling control method of SWDA communication in FIG. 3. Refer to FIGS. 4 and 5 together, clk1 through clkn are exemplary waveforms respectively representing the clock signals of the slave devices 14_1 through 14_n, SPI_BUS is an exemplary waveform representing the bus 17, and Oper_1 is the operating status of the slave device 14_1.

In the idle wait stage ST_IdleWait, as shown at time t1, the slave device 14_1 is configured to load the firmware FW1 from the memory device 24 via the bus 17. Next, at time t2, the slave device 14_1 is configured to use the security code SecurityIP to decode the firmware FW1, and to confirm whether the decoded firmware FW1 is usable and correct. Next, at time t3, the requirement controller 143_1 of the slave device 14_1 is configured to generate an interrupt request REQ1. In response to the interrupt request REQ1, the slave device 14_1 needs to perform the SWDA communication. Therefore, the slave device 14_1 is configured to control the alert handshaking pin Alert_1 to operate in the output mode and then to output a low voltage level to drive the alert-handshake control line ALERT_HAND, so as to notify the slave devices 14_2 through 14_n and the peripheral devices 15_1 through 15_m to enter the synchronization stage ST_Sync. Next, at time t4, after the synchronization phase ST_Sync is completed, the slave device 14_1 is configured to control the alert-handshake control line ALERT_HAND to operate in the input mode, so as to stop driving the alert-handshake control line ALERT_HAND. Thus, the slave devices 14_1 through 14_n and the peripheral devices 15_1 through 15_m of the bus system 1A are configured to enter the synchronization end stage ST_SyncEnd. In some embodiments, in the synchronization end stage ST_SyncEnd, each of the scheduling controllers 145_1 through 145_n is configured to wait for at least one clock cycle. Next, at time t5, the scheduling controllers 145_1 through 145_n are configured to control the slave devices 14_1 through 14_n to enter the assignment stage ST_Ass from the synchronization end stage ST_SyncEnd. Thus, the slave device 14_1 can perform the SWDA communication via the alert-handshake control line ALERT_HAND, so as to unlock the slave devices 14_2 through 14_n and the peripheral devices 15_1 through 15_m.

As described above, the unlocked slave devices 14_2 through 14_n can perform the eSPI communicate with the master device 10 through the bus 12 by driving the alert-handshake control line ALERT_HAND. Moreover, the unlocked slave devices 14_1 through 14_n are also configured to perform the SWDA communication with the unlocked peripheral devices 15_1 through 15_m by driving the alert-handshake control line ALERT_HAND. Furthermore, for the slave devices 14_1 through 14_n and the peripheral devices 15_1 through 15_m, the packets transmitted and/or received in the SWDA communication will be encrypted and/or decrypted with a specific key. Therefore, the SWDA packet transmitted by driving the alert-handshake control line ALERT_HAND will not be cracked after being monitored.

Figure 6:
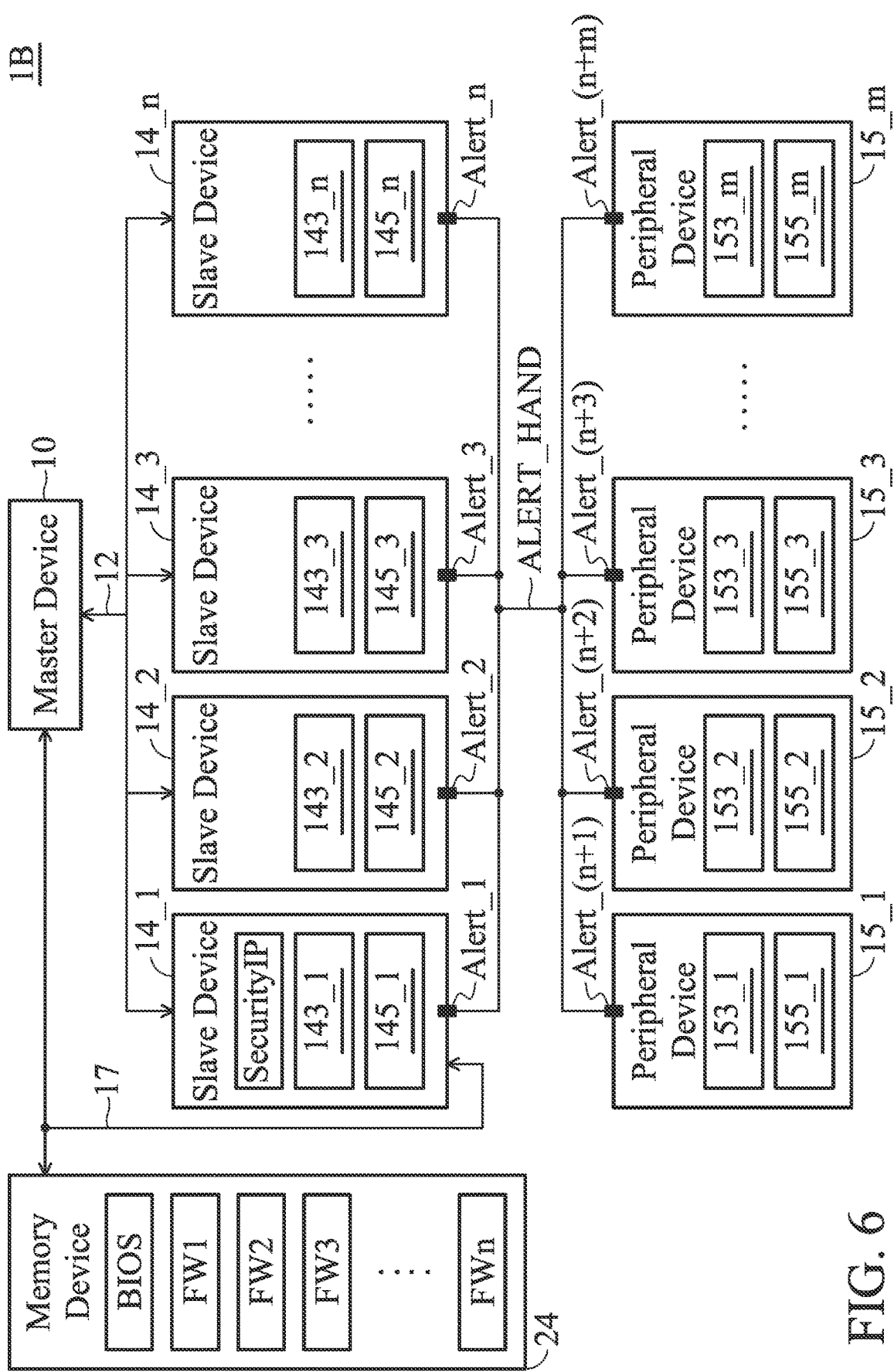
FIG. 6 shows the connection configuration of a bus system according to some embodiments of the invention.

FIG. 6 shows the connection configuration of a bus system 1B according to some embodiments of the invention. The bus system 1B in FIG. 6 has a configuration similar to that of the bus system 1A in FIG. 4, and the difference between the bus system 1B and the bus system 1A is that the firmware FW1 through FWn of the slave devices 14_1 through 14_n in the bus system 1B are all stored in the memory device 24. In other words, the number of slave devices 14_1 through 14_n is the same as the number of firmware FW1 through FWn.

Figure 7A:
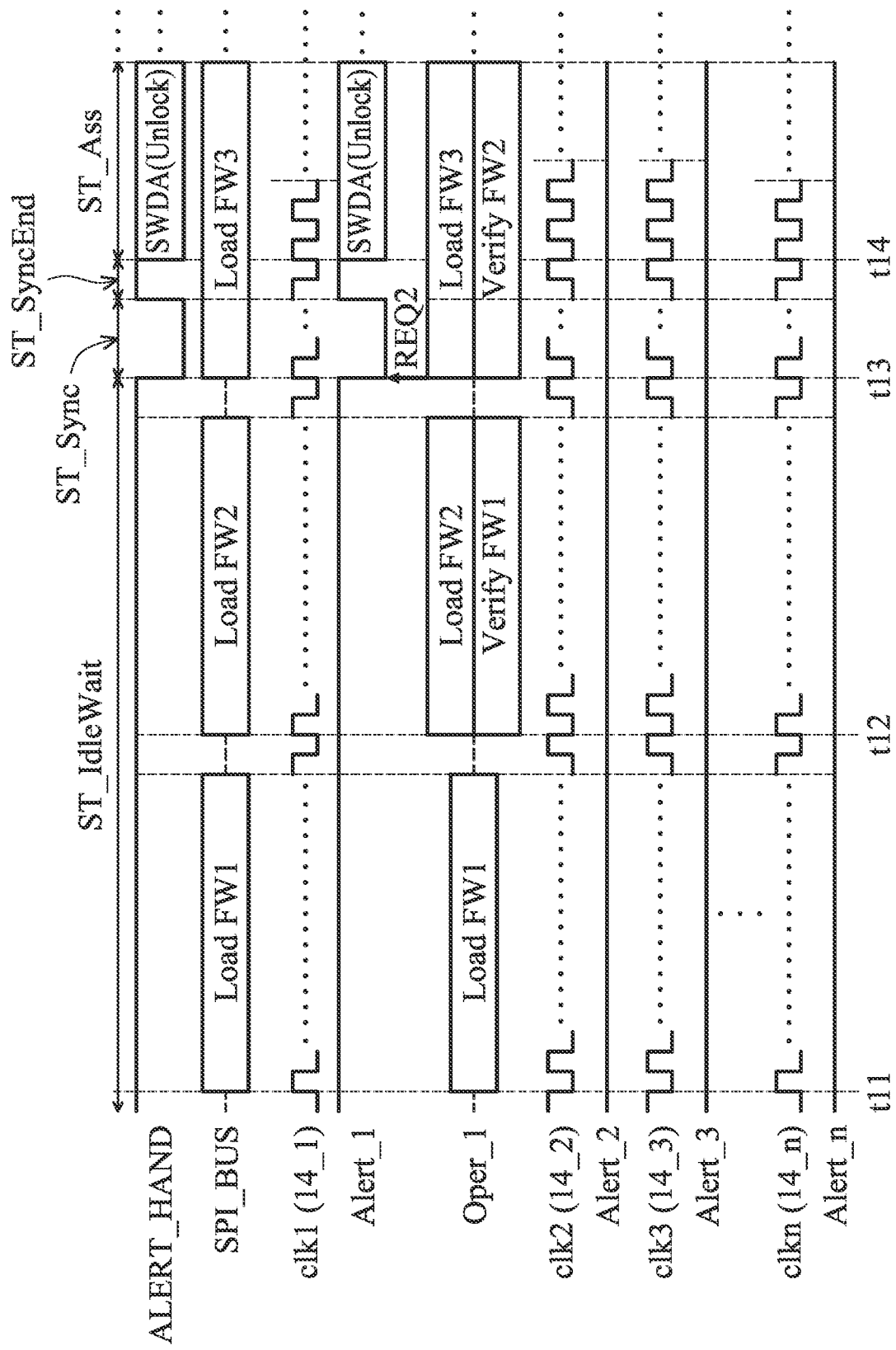
FIGS. 7A-7B show an exemplary waveform diagram of the bus system in FIG. 6 illustrating the slave devices drives the alert-handshake control line ALERT_HAND according to the scheduling control method of SWDA communication in FIG. 3.
Figure 7B:
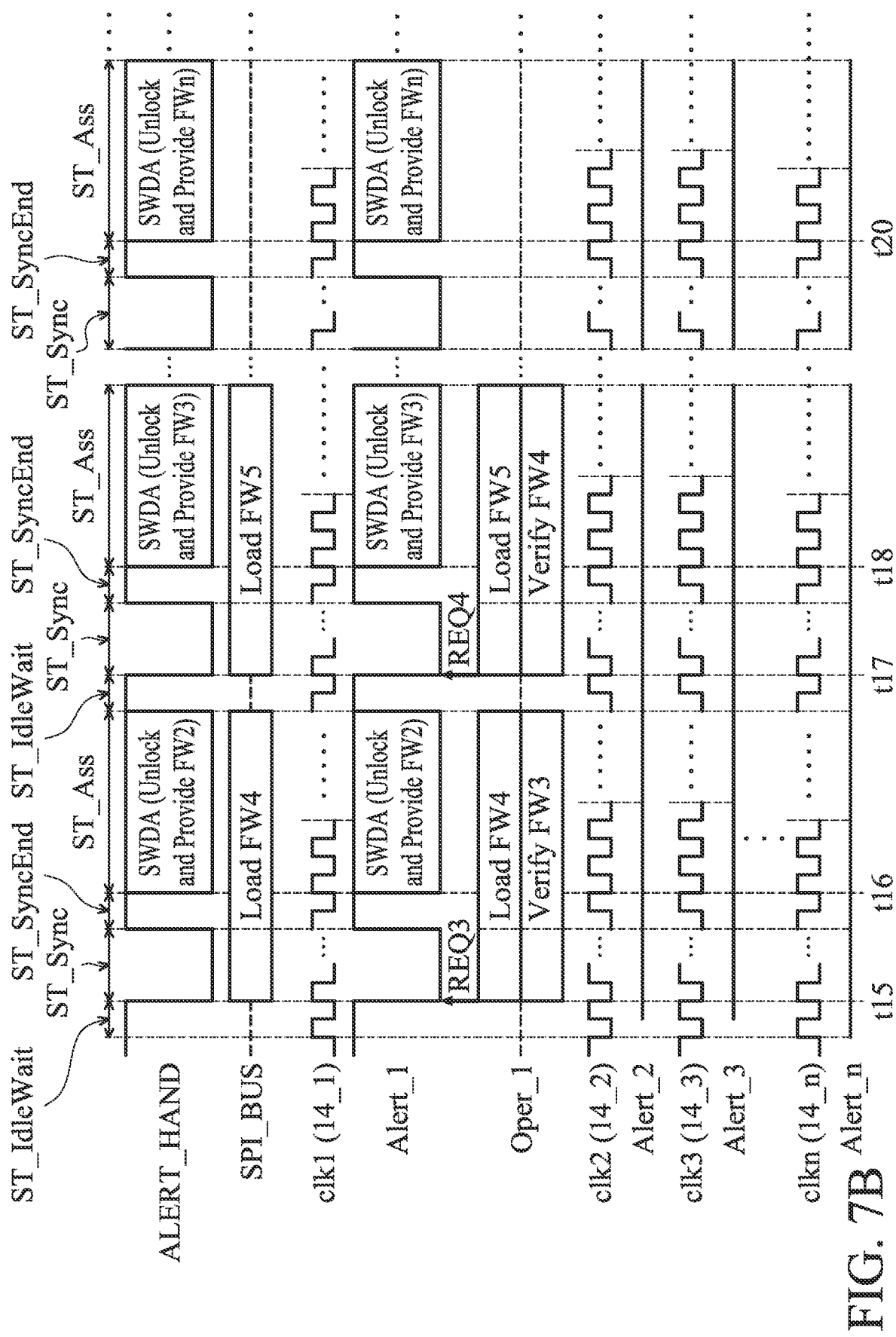

FIGS. 7A-7B show an exemplary waveform diagram of the bus system 1B in FIG. 6 illustrating the slave devices 14_1 through 14_n drives the alert-handshake control line ALERT_HAND according to the scheduling control method of SWDA communication in FIG. 3. Refer to FIGS. 6 and 7A-7B together, clk1 through clkn are exemplary waveforms respectively representing the clock signals of the slave devices 14_1 through 14_n, SPI_BUS is an exemplary waveform representing the bus 17, and Oper_1 is the operating status of the slave device 14_1.

Similar to the bus system 1A, in the initial stage of the bus system 1B booting, the slave devices 14_2 through 14_n are in a locked state, i.e., the master device 10 cannot communicate with the slave devices 14_2 through 14_n. Furthermore, in the initial stage of booting the bus system 1B, the master device 10 is configured to load the BIOS from the memory device 24 via the bus 17, and to perform the boot process according to the BIOS. In some embodiments, after the master device 10 completes the boot process, the master device 10 is configured to load the firmware FW1 from the memory device 24 via the bus 17, and to perform the eSPI communication via the bus 12, so as to provide the firmware FW1 to the slave device 14_1. In some embodiments, the slave device 14_1 is configured to load the firmware FW1 from the memory device 24 via the bus 17, as shown at time t11.

After obtaining the firmware FW1, the slave device 14_1 is configured to authenticate the firmware FW1 according to the built-in security code SecurityIP (as shown at time t12), to confirm whether the firmware FW1 is usable and correct.

At the same time, the slave device 14_1 is configured to load the firmware FW2 from the memory device 24 via the bus 17.

After obtaining the firmware FW2, the slave device 14_1 is configured to authenticate the firmware FW2 according to the security code SecurityIP (as shown at time t13), to confirm whether the firmware FW2 is usable and correct. At the same time, the slave device 14_1 is configured to load the firmware FW3 from the memory device 24 via the bus 17. Furthermore, in response to the previously verified firmware FW1, the requirement controller 143_1 of the slave device 14_1 is configured to generate an interrupt request REQ2. In response to the interrupt request REQ2, the slave device 14_1 needs to perform the SWDA communication. Thus, the slave device 14_1 is configured to control the alert handshaking pin Alert_1 to operate in the output mode and output a low voltage level, to drive the alert-handshake control line ALERT_HAND, so as to notify the peripheral devices 15_1 through 15_$m$. In response to the successfully authenticated firmware FW1, the slave device 14_1 is configured to perform the SWDA communication with the peripheral devices 15_1 through 15_$m$ via the alert-handshake control line ALERT_HAND, so as to unlock the peripheral devices 15_1 through 15_$m$ (as shown at time t14). Thus, the slave device 14_1 can perform the SWDA communication with the unlocked peripheral devices 15_1 through 15_$m$ through the alert-handshake control line ALERT_HAND, so as to control the operations of the peripheral devices 15_1 through 15_$m$. As described above, when performing the SWDA communication, the slave device 14_1 and peripheral devices 15_1 through 15_$m$ may use a specific key to decode the received packet and/or encode the packet to be transmitted.

After obtaining the firmware FW3, the slave device 14_1 is configured to authenticate the firmware FW3 according to the security code SecurityIP (as shown at time t15) to confirm whether the firmware FW3 is usable and correct. At the same time, the slave device 14_1 is configured to load the firmware FW4 from the memory device 24 via the bus 17. Furthermore, in response to the previously verified firmware FW2, the requirement controller 143_1 of the slave device 14_1 is configured to generate an interrupt request REQ3. In response to the interrupt request REQ3, the slave device 14_1 needs to perform the SWDA communication. Therefore, the slave device 14_1 is configured to control the alert handshaking pin Alert_1 to operate in the output mode and output a low voltage level, to drive the alert-handshake control line ALERT_HAND, so as to notify the slave device 14_2. In response to the successfully authenticated firmware FW2, the slave device 14_1 is configured to perform the SWDA communication with the slave device 14_2 via the alert-handshake control line ALERT_HAND, so as to unlock the slave device 14_2 and provide the verified firmware FW2 to the slave device 14_2 (as shown at time t16). Thus, according to the firmware FW2, the unlocked slave device 14_2 can perform the eSPI communicate with the master device 10 via, and can perform the SWDA communicate with the unlocked peripheral devices 15_1 through 15_$m$ via the alert-handshake control line ALERT_HAND, so as to control the operations of the peripheral devices 15_1 through 15_$m$.

In some embodiments, in response to the previously verified firmware FW2, the slave device 14_1 is configured to only unlock the slave device 14_2. Next, the unlocked slave device 14_2 is configured to perform the eSPI communication with the master device 10 via the bus 12, so as to load the firmware FW2 from the memory device 24 through the master device 10.

After obtaining the firmware FW4, the slave device 14_1 is configured to authenticate the firmware FW4 according to the security code SecurityIP (as shown at time t17), to confirm whether the firmware FW4 is usable and correct. At the same time, the slave device 14_1 is configured to load the firmware FW5 from the memory device 24 via the bus 17. Furthermore, in response to the previously verified firmware FW3, the requirement controller 143_1 of the slave device 14_1 is configured to generate an interrupt request REQ4. In response to the interrupt request REQ4, the slave device 14_1 needs to perform the SWDA communication. Thus, the slave device 14_1 is configured to control the alert handshaking pin Alert_1 to operate in the output mode and output a low voltage level, to drive the alert-handshake control line ALERT_HAND, so as to notify the slave device 14_3. In response to the successfully authenticated firmware FW3, the slave device 14_1 is configured to perform the SWDA communication with the slave device 14_3 via the alert-handshake control line ALERT_HAND, so as to unlock the slave device 14_3 and provide the verified firmware FW3 to the slave device 143 (as shown at time t18). Thus, according to the firmware FW3, the unlocked slave device 14_3 is configured to perform the eSPI communicate with the master device 10, and perform the SWDA communicate with the unlocked peripheral devices 15_1 through 15_$m$ via the alert-handshake control line ALERT_HAND, so as to control the operations of the peripheral devices 15_1 through 15_$m$. and so on, until the slave device 14_1 obtains and verifies the firmware FWn. Next, in response to the successfully authenticated firmware FWn, the slave device 14_1 is configured to perform the SWDA communication with the slave device 14_$n$, to unlock the slave device 14_$n$ and provide the verified firmware FWn to the slave device 14_$n$ (as shown at time t20).

It should be noted that if the firmware loaded by the slave device 14_1 fails to pass the authentication of the security code SecurityIP, the slave device 14_1 will not unlock the slave device corresponding to the firmware. Therefore, the slave device will remain in a locked state, so as to protect the internal data of the slave device.

According to the embodiments of the invention, each slave device in the bus system may perform the SWDA communication via the alert-handshake control line ALERT_HAND. Compared with the traditional bus system, the security code SecurityIP of the main slave device (such as 14_1 or 14_A) is used to perform verification. The bus system in the embodiments of the invention can save the security code required by other slave device, and help the slave device without a security code to perform security verification. Furthermore, by using the key to encrypt and decrypt the packets of SWDA communication, the security of the SWDA communication is increased.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. A bus system, comprising:
   a master device, an enhanced serial peripheral interface (eSPI) bus;
a serial peripheral interface (SPI) bus;
a memory device electrically connected to the master device via the SPI bus; and
a plurality of slave devices electrically connected to the master device via the eSPI bus,
wherein each of the slave devices has an alert handshake pin, and the alert handshake pins of the slave devices are electrically connected together via an alert-handshake control line,
wherein a first slave device of the slave devices is electrically connected to the memory device via the SPI bus;
wherein after obtaining a program code from the memory device, the first slave device is configured to verify the program code according to a security code, and to control the alert-handshake control line to unlock the slave devices except for the first slave device via the alert handshake pin in response to the verified program code;
wherein the unlocked slave devices are configured to communicate with the master device via the eSPI bus.

2. The bus system as claimed in claim 1, wherein the program code is a firmware of the first slave device, and the first slave device is configured to obtain the program code from the memory device via the SPI bus or via the eSPI bus and the master device.

3. The bus system as claimed in claim 1, wherein the slave devices except for the first slave device are electrically separated from the memory device, and the slave devices that are not unlocked cannot communicate with the master device via the eSPI bus.

4. The bus system as claimed in claim 1, wherein each of the slave devices comprises:
a packet decoder configured to decode a first packet from the alert-handshake control line and provided by other slave devices according to a key; and
a packet encoder configured to encode a second packet according to the key, and provide the encoded second packet to other slave devices via the alert-handshake control line.

5. The bus system as claimed in claim 1, further comprising:
a plurality of peripheral devices electrically connected to the slave devices through the alert-handshake control line,
wherein in response to the verified program code, the first slave device is configured to control the alert-handshake control line via the alert handshake pin, to unlock the peripheral devices;
wherein the first slave device and the unlocked slave devices are configured to communicate with the peripheral devices via the alert-handshake control line.

6. A bus system, comprising:
a master device;
an enhanced serial peripheral interface (eSPI) bus;
a serial peripheral interface (SPI) bus;
a memory device electrically connected to the master device via the SPI bus; and
a plurality of slave devices electrically connected to the master device via the eSPI bus,
wherein each of the slave devices has an alert handshake pin, and the alert handshake pins of the slave devices are electrically connected together via an alert-handshake control line,
wherein a first slave device of the slave devices is electrically connected to the memory device via the SPI bus;
wherein after obtaining a plurality of program codes from the memory device, the first slave device is configured to verify the program codes according to a security code;
wherein in response to the verified program codes, the first slave device is configured to control the alert-handshake control line via the alert handshake pin to unlock the slave devices corresponding to the verified program codes;
wherein after unlocking, the slave devices corresponding to the verified program codes are configured to communicate with the master device through the eSPI bus.

7. The bus system as claimed in claim 6, wherein the number of program codes is the same as the number of slave devices, and the slave devices corresponding to the verified program codes are configured to obtain the verified program codes via the alert-handshake control line and the first slave device, or to obtain the program codes from the memory device via the eSPI bus and the master device.

8. The bus system as claimed in claim 6, wherein the slave devices except for the first slave device are electrically separated from the memory device, and the slave devices that are not unlocked cannot communicate with the master device via the eSPI bus.

9. The bus system as claimed in claim 6, wherein each of the slave devices comprises:
a packet decoder configured to decode a first packet from the alert-handshake control line and provided by other slave devices according to a key; and
a packet encoder configured to encode a second packet according to the key, and provide the encoded second packet to other slave devices via the alert-handshake control line.

10. The bus system as claimed in claim 6, further comprising:
a plurality of peripheral devices electrically connected to the slave devices via the alert-handshake control line,
wherein in response to the verified program codes, the first slave device is configured to control the alert-handshake control line via the alert handshake pin, to unlock the peripheral devices;
wherein the first slave device and the unlocked slave devices are configured to communicate with the peripheral devices via the alert-handshake control line.

* * * * *